United States Patent [19]

Carroll, III et al.

[11] Patent Number: 5,409,165
[45] Date of Patent: Apr. 25, 1995

[54] WEAR RESISTANT FUEL INJECTOR PLUNGER ASSEMBLY

[75] Inventors: John T. Carroll, III, Columbus, Ind.; Katsuhiro Shinosawa, Tokyo, Japan; Lester L. Peters, Columbus, Ind.; Jeffrey L. Campbell, Hope, Ind.; Joseph C. Bentz, Columbus, Ind.

[73] Assignees: Cummins Engine Company, Inc., Columbus, Ind.; Toshiba Corp., Tokyo, Japan

[21] Appl. No.: 213,453

[22] Filed: Mar. 14, 1994

Related U.S. Application Data

[63] Continuation of Ser. No. 34,341, Mar. 19, 1993, abandoned.

[51] Int. Cl.⁶ .............................................. F02M 47/00
[52] U.S. Cl. ..................................... 239/88; 239/533.3; 239/600; 239/DIG. 79; 251/368; 403/28; 403/292; 403/361; 29/888.45
[58] Field of Search ..................................... 239/88–96, 239/600, DIG. 19, 533.3; 251/368, 357; 403/273, 361, 292, 28; 29/888.45, 888.451, 888.452, 888.453

[56] References Cited

U.S. PATENT DOCUMENTS

| | | | |
|---|---|---|---|
| 470,514 | 3/1892 | Simpson | 403/292 |
| 2,727,715 | 12/1955 | Tuthill | 251/357 |
| 3,419,220 | 12/1968 | Goodwin et al. | 239/591 |
| 3,773,265 | 11/1973 | Kent | 239/DIG. 19 |
| 4,266,729 | 5/1981 | Kulke et al. | 239/DIG. 19 |
| 4,325,647 | 4/1982 | Maier et al. | 403/29 |
| 4,592,506 | 6/1986 | Capes et al. | 239/139 |
| 4,614,453 | 9/1986 | Tsuno et al. | 403/273 |
| 4,794,894 | 1/1989 | Gill | 403/28 |
| 4,806,040 | 2/1989 | Gill et al. | 403/24 |
| 4,848,286 | 7/1989 | Bentz | 123/90.61 |
| 4,991,771 | 2/1991 | Porchet et al. | 239/DIG. 19 |
| 5,040,727 | 8/1991 | Muntean et al. | 239/91 |
| 5,159,952 | 11/1992 | Ono | 251/368 |
| 5,178,362 | 1/1993 | Vogt et al. | 251/368 |

FOREIGN PATENT DOCUMENTS

| | | | |
|---|---|---|---|
| 459116 | 8/1949 | Canada | 29/888.451 |
| 531986 | 1/1941 | United Kingdom | 29/888.45 |
| 2237523 | 5/1991 | United Kingdom | 29/888.451 |

Primary Examiner—Karen B. Merritt
Attorney, Agent, or Firm—Sixbey, Friedman, Leedom & Ferguson

[57] ABSTRACT

A highly wear-resistant plunger assembly for a fuel injector, particularly an open nozzle fuel injector, is provided. The wear-resistant plunger assembly of the present invention includes components formed from wear-resistant materials specifically including, but not limited to, ceramics and metals capable of withstanding the high temperatures and frictional forces produced by prolonged motoring and other potentially adverse engine operating conditions. Different portions of the plunger assembly may be formed from different kinds of wear-resistant materials.

9 Claims, 4 Drawing Sheets

FIG. 4a FIG. 4b
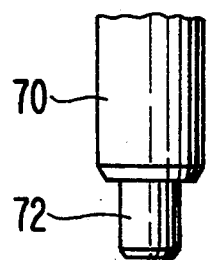
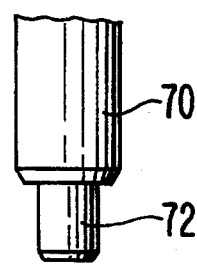
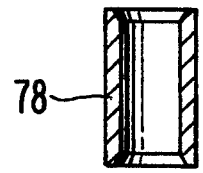
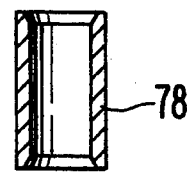
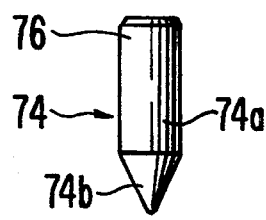
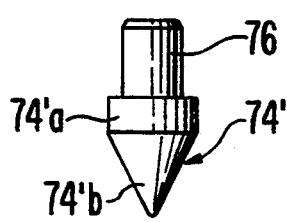

WEAR RESISTANT FUEL INJECTOR PLUNGER ASSEMBLY

This application is a continuation of Ser. No. 08/034,341, filed Mar. 19, 1993, now abandoned.

TECHNICAL FIELD

The present invention relates generally to high pressure fuel injectors and specifically to a wear-resistant plunger assembly for a high pressure fuel injector.

BACKGROUND OF THE INVENTION

Unit fuel injectors of the type that are individually associated with each of the cylinders in an internal combustion engine may be closed nozzle or open nozzle in construction. Closed nozzle injectors employ a pressure sensitive valve mechanism that opens a metering chamber only during injection, while open nozzle injectors include a metering chamber that is kept open to the engine cylinder. Open nozzle fuel injectors are preferred for high pressure injector applications in diesel engines. Closed nozzle injectors are substantially more complex structures than open nozzle injectors, function on different operational principles from an open nozzle injector, and cost more to produce. Although the plungers and associated structures of both types of fuel injectors are susceptible to wear, the plungers and plunger seats of open nozzle injectors are particularly subject to wear and associated performance degradation.

In some diesel fuel injector applications the engine duty cycles include prolonged motoring conditions. When the engine is operating under such motoring conditions, little or even no fuel may be present in the injector metering chamber. During prolonged motoring conditions the injector plunger, which is driven by the rotating camshaft, continues to operate. As a result, the temperature inside the metering chamber can become quite high. After a period of time, the plunger and seat, in particular, exhibit varying degrees of wear, which is a combination of material fatigue, deformation and wear. The performance of the injector is inefficient and even ineffective because of this wear. Engine performance, particularly the output and the completeness of combustion, suffers when injector performance is degraded. Moreover, if the wear of the injector plunger assembly is extensive, failure of the injector is likely. Frequent replacement of the injector components increases the cost of engine operation.

The problem of unit fuel injector plunger assembly wear caused by prolonged motoring conditions in a diesel engine has not been addressed by the prior art. U.S. Pat. No. 4,266,729 to Kulke et. al. proposes modifying a closed tip fuel injector by making the nozzle needle tip and disc containing the ejection opening from a corrosion-resistant material, such as steel, ceramic or industrial glass, to prevent the constriction of the ejection opening from corrosion. However, Kulke et. al. does not suggest modifying the plunger itself or other plunger components in a closed nozzle or an open nozzle fuel injector to make them resistant to the material fatigue, deformation and wear caused by prolonged motoring of the engine.

It has been suggested to form fuel injector components and other engine components frown ceramics, in part to enhance their wear-resistance. In U.S. Pat. No. 4,991,771, Porchet et. al. disclose the use of a pair of ceramic rings on each side of a nozzle opening in a fuel injection valve to reduce corrosion or erosion in the valve. U.S. Pat. No. 4,592,506 to Capes et. al. discloses an atomizing nozzle assembly with a cone-shaped deflector core and a nozzle rim made of a wear-resistant ceramic material. U.S. Pat. Nos. 4,794,894 to Gill; 4,806,040 to Gill et al and 4,848,286 to Bentz disclose, respectively, ceramic tipped pivot rods and a ceramic ball and socket joint for use in internal combustion engines. None of the foregoing patents suggests prolonging unit fuel injector life or preventing injector component wear in a fuel injector when a diesel engine is repeatedly subjected to the prolonged motoring conditions which occur when the engine functions as a vehicle retarder, such as during compression brake operation.

During compression brake operation, fuel metering is suspended while the injector continues to operate without the cooling and lubricating benefit of the fuel. Efforts have been undertaken to solve the problem of plunger and nozzle wear caused by prolonged motoring by the assignee of the present invention. Different materials, primarily different types of steel, were used to form the injector nozzle and plunger to enhance their wear-resistance. Additionally, heat treatments, coatings, such as TiN, carburizing, and nitriding were employed for this purpose. Lower wear combinations of plunger and nozzle materials were identified which were effective in reducing motoring wear. However, the wear reduction thus achieved was not sufficient to improve engine performance, particularly in the areas of power output, fuel economy and emissions, over a wide range of operating conditions.

The prior art, therefore, has failed to provide a means of improving engine performance while eliminating excessive fuel injector component wear, especially plunger and nozzle seat wear in a fuel injector, particularly an open nozzle unit fuel injector in a diesel engine having a duty cycle that includes prolonged motoring. Consequently, there is a need for a wear-resistant plunger assembly for a unit fuel injector capable of resisting material fatigue, deformation and wear when the engine is repeatedly subjected to prolonged periods of motoring so that engine performance is improved over a wide range of operating conditions.

SUMMARY OF THE INVENTION

It is a primary object of the present invention, therefore, to overcome the disadvantages of the prior art and to provide a wear-resistant plunger assembly for an internal combustion engine unit fuel injector which is sufficiently wear-resistant to improve engine performance.

It is another object of the present invention to provide a plunger assembly for an internal combustion engine unit fuel injector capable of repeated stable fuel injection performance over an extended period of time.

It is a further object of the present invention to provide a plunger assembly for an internal combustion engine open nozzle unit fuel injector which cost effectively eliminates excessive wear.

It is still another object of the present invention to provide a plunger assembly for an internal combustion engine open nozzle unit fuel injector constructed so that resistance to different types of wear is optimized in the different plunger assembly portions subjected to these different kinds of wear.

It is yet another object of the present invention to provide a plunger assembly for an internal combustion engine open nozzle unit fuel injector characterized by greater fuel injector durability when the fuel injector is subjected to extended no-adjust periods.

It is yet a further object of the present invention to provide a plunger assembly for an internal combustion engine open nozzle unit fuel injector capable of maintaining a high injection rate and crush load capability even under adverse operating conditions.

The foregoing objects are achieved by providing a wear-resistant plunger assembly for an internal combustion engine open nozzle unit fuel injector including a wear-resistant plunger body to which is secured a wear-resistant plunger tip. The plunger tip may be secured to the plunger body by press-fitting the tip into a recess in the plunger body. Alternatively, a sleeve may be press-fit onto the plunger body and the plunger tip may be press-fit into the sleeve. The tip may be formed to be straight or stepped. Preferred wear-resistant materials for this purpose include ceramics such as silicon nitride and alumina-zirconia composites. However, other materials including various tool steels and coatings can also be used. The plunger seat structures in the injector body may also be formed of wear-resistant ceramics to maximize durability.

BRIEF DESCRIPTION OF THE DRAWINGS

FIGS. 4a and 4b illustrate an alternate means of attaching the fuel injector plunger tip to the plunger body.

BEST MODE FOR CARRYING OUT THE INVENTION

Fuel injector components, particularly the plunger body, plunger tip and nozzle seat, must function under conditions which cause these components to wear relatively quickly. As a result, they cannot continue to perform effectively. Poor repeatability and stability, in particular, are symptomatic of plunger and nozzle seat wear. This wear, moreover, is aggravated by engine duty cycles that include prolonged motoring. During motoring the engine acts as a vehicle retarder, which it also does during compression brake operation. Because the injector continues to operate without the cooling and lubricating benefit of fuel, the interface between the seated plunger and nozzle seat is subjected to substantial wear. Moreover, the material of the structures at this interface will become fatigued and deformed if the periods of motoring are frequent or prolonged. It has been recognized that reducing wear of this type will improve engine performance, particularly power output, fuel economy and emissions, over a wide range of operating conditions. Although the injector plunger and nozzle have been fabricated from different metals that have been subjected to heat treatments to improve wear, the desired reduction in wear caused by prolonged motoring has not been achieved until the present invention.

Figure 1C:
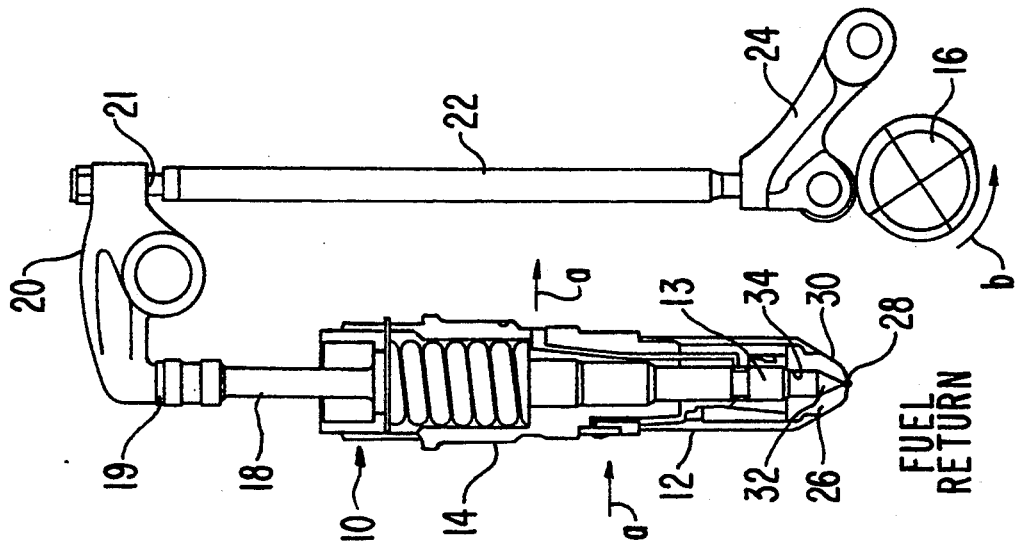
FIGS. 1a, 1b and 1c illustrate an injection operating cycle for an open nozzle fuel injector.
Figure 1B:
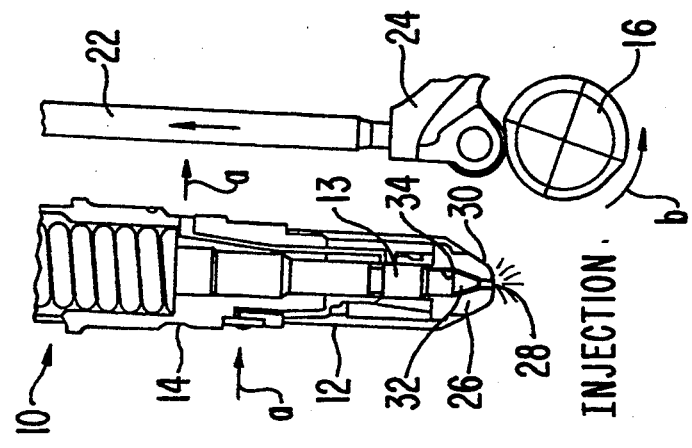
Figure 1A:
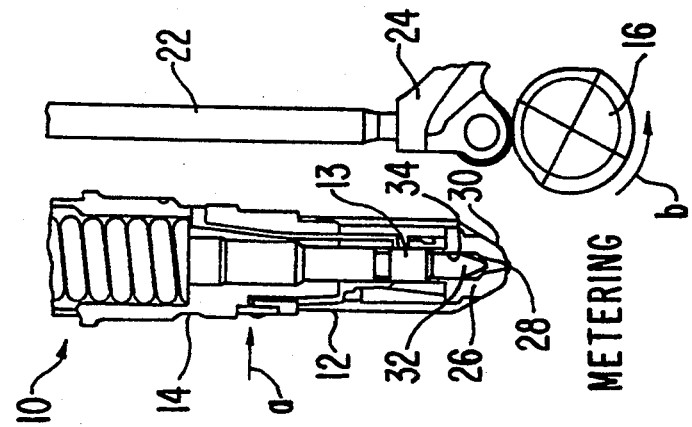

FIGS. 1a, 1b and 1c illustrate an open nozzle fuel injector 10 during a typical engine operating cycle. The movement of the plunger 12 in the injector body 14 between a metering position (FIG. 1a) and an injection position (FIG. 1b) is controlled by the rotation of the camshaft 16. The injector plunger 12 is connected to link 18, which is attached to one end 19 of a rocker lever 20. A pushrod 22 connects a cam follower 24, which directly contacts the camshaft 16, to the other end 21 of the rocker arm 20. In the metering stage in the operating cycle the plunger is almost fully retracted so that a metered or measured quantity of fuel can enter the injector cup 26. Arrows a indicate the flow of fuel through the injector. The fuel is then compressed by the advancing plunger and is simultaneously expelled through orifices 28 in the injector nozzle 30 into the combustion chamber (not shown) during the injection stage. This occurs as the camshaft 16 rotates in the direction shown by arrow b in FIG. 1. The fuel injection process terminates when the plunger tip 32 firmly seats in the nozzle portion 34 (FIG. 1c). The plunger 12 is then returned to the retracted position of the metering phase, and the cycle is repeated. Optimum engine performance, especially the power output and completeness of combustion, is dependent on the long term repeatability and stability relative to an original calibrated condition of this fuel injection process.

When the engine operating condition known as motoring occurs, fuel metering is suspended so that fuel does not enter the injector cup 26. However, because the camshaft 16 continues to rotate, the injector plunger 12 is continuously retracted and advanced as the crankshaft 16 rotates, but without the cooling and lubricating benefit of the fuel. As a result, the fuel injector plunger 12, plunger tip 32, nozzle seat 34, and associated structures are subjected to undesirable frictional forces and high temperatures, causing material fatigue, deformation and wear. An excessively worn fuel injector plunger assembly cannot function effectively to inject an optimum amount of fuel from the injector cup 26 into the combustion chamber (not shown).

The present invention provides a plunger assembly for an open nozzle fuel injector that resists material fatigue, deformation and wear, even during repeated periods of prolonged motoring. The materials forming the plunger assembly can be selected so that different portions, such as, for example, the plunger body 13, plunger tip 32 and nozzle seat 34, of the plunger assembly are made of a material which optimizes resistance to the different types of wear that occur in each plunger portion. For example, the plunger body 13 is usually subjected to sliding wear, while the plunger seating surface, including plunger tip 32 and nozzle portion 34, are subjected to impact wear. These plunger portions can be formed of materials which resist these different types of wear. Ceramic materials with superior wear resistance, such as, for example silicon nitride ceramics and alumina-zirconia composite ceramics are preferred for this purpose. Combinations of wear-resistant metals and coated metals can also be used. Depending upon the type of fuel injector, the plunger assembly may be constructed so that the tip portion is secured directly to the plunger or a sleeve can be used to join the two members. FIGS. 2a, 2b, 3a, 3b, 4a and 4b illustrate both arrangements.

Figures 2A, 2B:
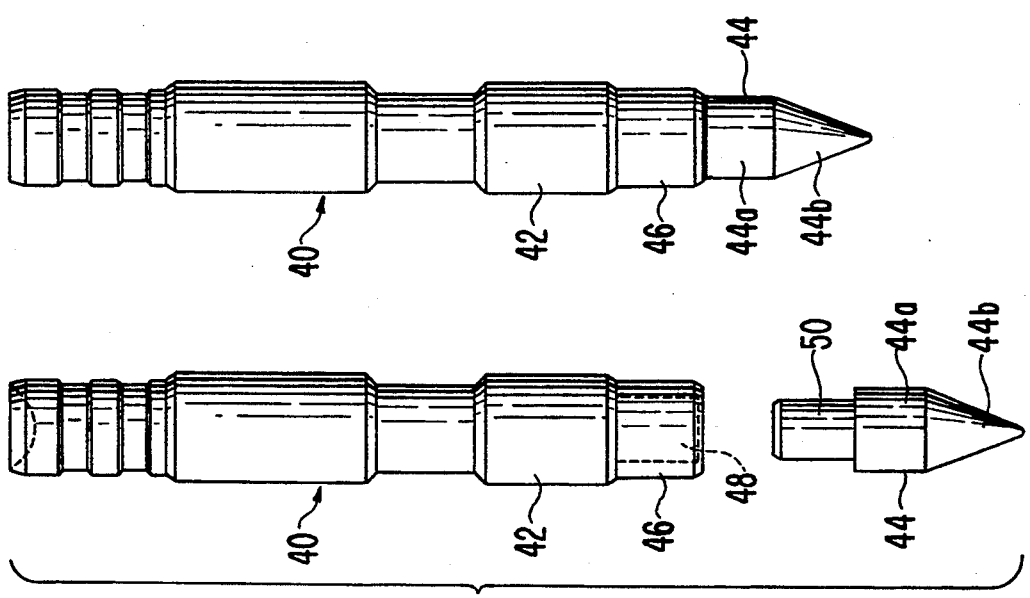
FIGS. 2a and 2b illustrate one embodiment of an open nozzle fuel injector plunger body and plunger tip according to the present invention.

FIGS. 2a and 2b show a plunger 40 for an open nozzle fuel injector (not shown). In this embodiment of the present invention the plunger body 42, which may be a conventional plunger body component, is modified to receive a plunger tip 44, which is preferably made of a ceramic that is especially resistant to impact wear. The lowermost section 46 of the plunger body 42, which may be made of metal or ceramic, has been counterbored to form a recess 48. A plunger tip 44, which also may be formed from a wear-resistant ceramic material, includes a projection 50. The diameter of the projection 50 is sized to be securely press-fit into the recess 48. An assembly fixture (not shown) may be used to hold and guide the plunger body 42 and plunger tip 44 during assembly. After assembly, all of the exposed tip surfaces are finished according to the specifications for a conventional plunger.

The plunger tip 44 is shown formed in a stepped configuration so that the projection 50 has a smaller diameter than the diameter of the plunger tip 44. The diameter of projection 50 is selected so that it approximates the diameter of the recess 48 to allow a proper press fit. The diameter of the central tip section 44a is approximately the same as that of the lowermost section 46 of the plunger body 42. FIG. 2b shows the tip 44 press fit into the plunger body 42 to form the finished injector plunger.

Figures 3A, 3B:
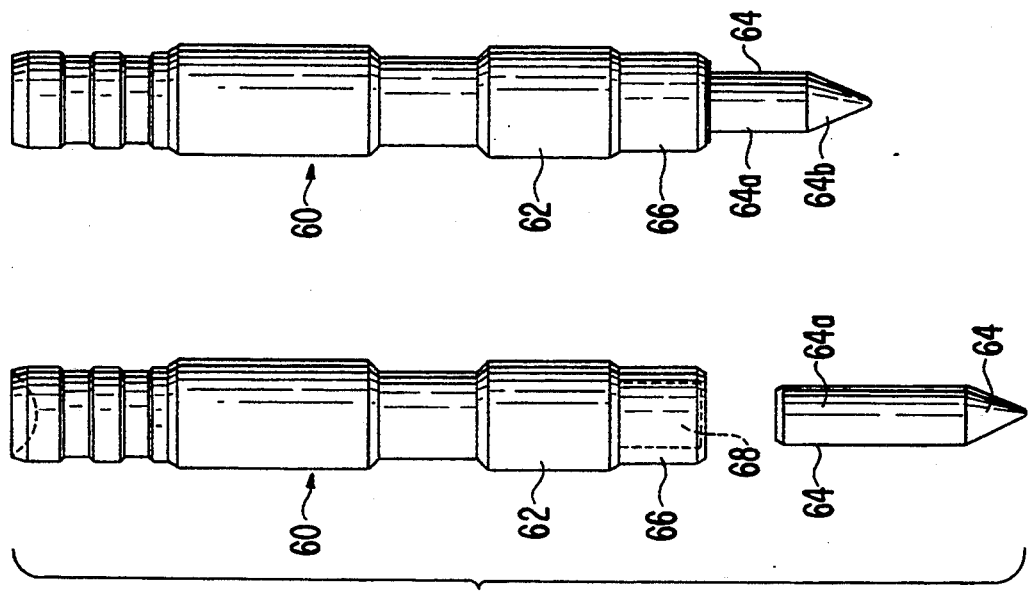
FIGS. 3a and 3b illustrate a second embodiment of an open nozzle fuel injector plunger body and plunger tip according to the present invention.

FIGS. 3a and 3b illustrate a second embodiment of a plunger assembly of the present invention. In this embodiment, the plunger body 62 also includes a lowermost section 66 which is counterbored to form a recess 68. A plunger tip 64 is press fit into the recess 68. In this embodiment, the plunger tip 64 does not have a separate attachment projection, but is formed to have a straight configuration that has a constant diameter section 64a. The diameter of section 64a is selected relative to the diameter of recess 68 to permit a secure press fit of the plunger tip 64 to the plunger body 62. Plunger tip 64 also includes a tip section 64b. As with the plunger assembly 40 of FIGS. 2a and 2b, one or both of the plunger body and tip of plunger assembly 60 are preferably formed of wear-resistant ceramics.

In the FIGS. 2a and 2b and FIGS. 3a and 3b embodiments different types of ceramics may be used to form the plunger body (42, 62) and the plunger tip (44, 64) to maximize resistance to the different kinds of wear these components are subject to. The plunger body is subjected more to sliding wear, while the plunger tip is subjected to impact wear as a result of being forced against the nozzle seat during the injection phase of the fuel injection cycle. (FIG. 1b)

FIGS. 4a and 4b illustrate another arrangement of a wear-resistant plunger assembly which can be constructed according to the present invention to secure a tip to the plunger body. A conventional plunger may be modified or a plunger may be specially formed with the construction shown in FIGS. 4a and 4b. The lower most end of the plunger body 70 is formed to have an attachment projection 72. A plunger tip 74 is formed to the desired dimensions, preferably from a wear-resistant ceramic material, to include a tip attachment projection 76. An attachment sleeve 78 sized to receive the plunger attachment projection 72 and the tip attachment projection 76 is also press-fit onto the exterior of plunger projection 72. The tip attachment projection 76 is press-fit into the sleeve 78, using fixtures (not shown) to hold and guide the sleeve 78 and the other parts during assembly. After assembly, the sleeve 78 and the conical portion (74b, 74'b) of the plunger tip 74 are finished according to specifications for a conventional plunger.

The plunger tip 74 may be formed to have either a straight profile in which the tip attachment projection 76 has a constant diameter and is contiguous with the conical tip section 74a as shown in FIG. 4a. In this case the diameter of the tip attachment projection 76 and the uppermost portion of the tip section 74a will be slightly less than that of the interior diameter of the sleeve 78 to insure a secure press fit. Alternatively, the plunger tip 74 may be formed to have a stepped profile with a small diameter section corresponding to the tip attachment projection 76 and a large diameter section 74'a between the small diameter section and the tip 74'b as shown in FIG. 4b. In this case the diameter of the small diameter section 76 will be sized relative to the sleeve 78 interior diameter to provide a secure press fit, and the diameter of the large diameter section 74'a is substantially the same as the exterior diameter of the sleeve 78. In the FIGS. 4a and 4b arrangement, the plunger body 70 and plunger tip 74 are preferably formed of wear-resistant ceramics, and the sleeve 78 is made of a metal that will allow two ceramic components to be securely fitted together in a manner which will withstand the stresses to which these structures are subjected during the fuel injection cycle.

The plunger assemblies of the present invention can be fabricated from available finished plunger components. Alternatively, assembly and ceramics finishing of the injector plunger assemblies described herein can be integrated into the fuel injector production and manufacturing process to produce more cost effective plunger assemblies.

Figure 5:
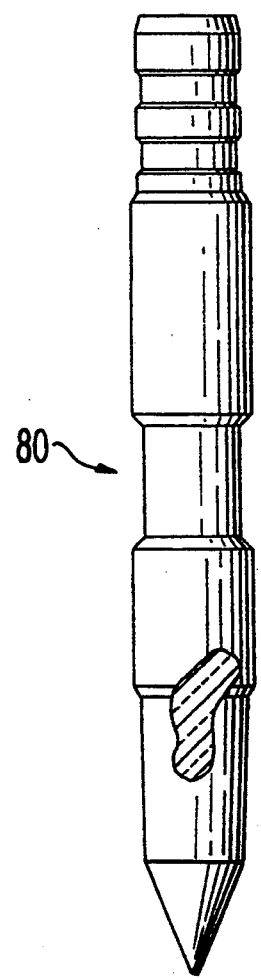
FIG. 5 illustrates a unitary fuel injector plunger according to the present invention formed of a single ceramic material.

It is also possible to fabricate the entire plunger 80 from a single piece of a wear-resistant ceramic as shown in FIG. 5. In this case a ceramic should be selected that is optimally resistant to both sliding wear an impact wear.

Although the wear-resistant fuel injector plunger assembly of the present invention is especially well-suited for use in an open nozzle fuel injector, the needle of a closed nozzle type of fuel injector could also be formed of a wear-resistant ceramic. In this case, a one piece wear-resistant ceramic needle will produce a better dynamic response. This results in a quicker end of injection and reduces particulate emissions.

The primary wear-resistance benefits achieved by the ceramic plunger assemblies of the present invention are realized under special engine operating conditions such as motoring. However, the fuel injector plunger assemblies of the present invention provide additional benefits as well. Fuel injectors made with these ceramic plunger assemblies exhibit greater durability with extended no-adjust periods, particularly when they are activated by stiffer overhead cam trains or operate on less lubricious fuels than standard #2 diesel fuel. Such lower lubricity fuels are fuels like kerosene, Jet-A, Jet-B, JP-4, JP-5, and JP-8. Moreover, no exhaust treatment device is required because the higher injection rate and crush load capability of fuel injectors with the plunger assemblies of the present invention increase fuel economy and reduce emissions.

Industrial Applicability

The wear-resistant fuel injector plunger assemblies of the present invention will find their primary application in the fuel injectors of diesel engines that are repeatedly subjected to prolonged motoring or other engine operating conditions that cause the plunger assemblies to wear. The wear-resistant plunger assemblies of the present invention will also be useful whenever a highly durable, efficient fuel injector is required.

We claim:

1. An open nozzle unit fuel injector for an internal combustion engine that is subjected to prolonged and repeated periods of motoring and includes a fuel injection cycle characterized by metering, injection and fuel return phases, wherein said open nozzle fuel injector includes
   (a) an injector body including a nozzle portion in direct fluid communication with an engine combustion chamber; and
   (b) plunger means axially slidable within the injector body for injecting a metered quantity of fuel into said combustion chamber during said injection phase, wherein said plunger means includes a plunger tip formed from an impact wear-resistant ceramic material secured by press fitting to a plunger body formed from a wear-resistant material selected from the group consisting of sliding wear-resistant ceramics and sliding wear-resistant metals and including a recess to receive said plunger tip, and said plunger tip includes a distal end configured to seat securely in said injector body nozzle portion during said fuel return phase contiguous with a constant axial diameter portion, wherein said constant axial diameter portion is sized relative to the diameter of said recess to provide a secure press fit of said constant axial diameter portion of said plunger tip in said recess of said plunger body, the materials for said plunger tip and said plunger body being selected to maintain efficient fuel injector performance during all phases of said fuel injection cycle and during said prolonged and repeated periods of motoring.

2. The open nozzle unit fuel injector of claim 1, wherein said plunger body is formed from a sliding wear-resistant metal.

3. An open nozzle unit fuel injector for an internal combustion engine that is subjected to prolonged and repeated periods of motoring and includes a fuel injection cycle characterized by metering, injection and fuel return phases, wherein said open nozzle fuel injector includes
   (a) an injector body including a nozzle portion in direct fluid communication with an engine combustion chamber; and
   (b) plunger means axially slidable within the injector body for injecting a metered quantity of fuel into said combustion chamber during said injection phase, wherein said plunger means includes a plunger tip formed from an impact wear-resistant ceramic material secured by press fitting to a plunger body formed from a wear-resistant material selected from the group consisting of sliding wear-resistant ceramics and sliding wear-resistant metals and including a recess to receive said plunger tip, and said plunger tip has a stepped configuration and includes a distal end configured to seat securely in said injector body nozzle portion during said fuel return phase, a large diameter portion adjacent to said distal end, and a small diameter portion adjacent to said large diameter portion, wherein said small diameter portion is sized relative to the diameter of said recess to provide a secure press fit of said small diameter portion in said recess, the materials for said plunger tip and said plunger body being selected to maintain efficient fuel injector performance during all phases of said fuel injection cycle and during said prolonged and repeated periods of motoring.

4. The open nozzle unit fuel injector of claim 3, wherein said plunger body is formed from a sliding wear-resistant metal.

5. An open nozzle unit fuel injector for an internal combustion engine that is subjected to prolonged and repeated periods of motoring and includes a fuel injection cycle characterized by metering, injection and fuel return phases, wherein said open nozzle fuel injector includes
   (a) an injector body including a nozzle portion in direct fluid communication with an engine combustion chamber; and
   (b) plunger means axially slidable within the injector body for injecting a metered quantity of fuel into said combustion chamber during said injection phase, wherein said plunger means includes a plunger tip formed from an impact wear-resistant ceramic material secured by press fitting to a plunger body formed form a wear-resistant material selected from the group consisting of sliding wear-resistant ceramics and sliding wear-resistant metals, the materials for said plunger tip and said plunger body being selected to maintain efficient fuel injector performance during all phases of said fuel injection cycle and during said prolonged and repeated periods of motoring, wherein said plunger body includes a projection with a smaller diameter than the diameter of said plunger body and said plunger tip includes a distal end configured to seat securely in said injector body nozzle portion during said fuel return phase contiguous with a constant axial diameter portion having a diameter substantially identical to said projection diameter, and further including sleeve means for securing said plunger to said plunger body, wherein said sleeve means has an internal diameter sized relative to said projection diameter and to said constant axial diameter portion to provide a secure press fit of said plunger tip to said plunger body.

6. The open nozzle unit fuel injector of claim 5, wherein said plunger body is formed of a sliding wear-resistant ceramic and said sleeve means is formed of metal.

7. An open nozzle unit fuel injector for an internal combustion engine that is subjected to prolonged and repeated periods of motoring and includes a fuel injector cycle characterized by metering, injection and fuel return phases, wherein said open nozzle fuel injector includes
   (a) an injector body including a nozzle portion in direct fluid communication with an engine combustion chamber; and
   (b) plunger means axially slidable within the injector body for injecting a metered quantity of fuel into said combustion chamber during said injection phase, wherein said plunger means includes a plunger tip formed from an impact wear-resistant ceramic material secured by press fitting to a plunger body formed form a wear-resistant material selected from the group consisting of sliding wear-resistant ceramics and sliding wear-resistant metals, the materials for said plunger tip and said plunger body being selected to maintain efficient fuel injector performance during all phases of said fuel injection cycle and during said prolonged and repeated periods of motoring, wherein said plunger body includes a projection with a smaller diameter than the diameter of said plunger body and said plunger tip has a stepped configuration and includes a distal end configured to seat securely in said injector body nozzle portion during said fuel return phase, a large diameter portion adjacent to said distal end and a small diameter portion adjacent to said large diameter portion and having a diameter substantially identical to said projection diameter, and further including sleeve means for securing said plunger tip to said plunger body, wherein said sleeve means has an internal diameter sized relative to said projection diameter and to said small diameter portion to provide a secure press fit of said plunger tip to said plunger body.

8. The open nozzle unit fuel injector of claim 7, wherein said plunger body is formed of a sliding wear-resistant ceramic and said sleeve means is formed of metal.

9. The open nozzle unit fuel injector of claim 1, 3, 5, or 7, wherein said plunger tip is formed of a ceramic material selected from the group consisting of silicon nitride and alumina zirconia composites.

* * * * *